Oct. 31, 1944.  E. W. SPARLING  2,361,661
STEREOSCOPIC CAMERA
Filed July 23, 1941  2 Sheets-Sheet 1

ELLIOTT W. SPARLING,
INVENTOR

Oct. 31, 1944.  E. W. SPARLING  2,361,661
STEREOSCOPIC CAMERA
Filed July 23, 1941   2 Sheets-Sheet 2

ELLIOTT W. SPARLING,
INVENTOR

BY
ATTORNEY.

Patented Oct. 31, 1944

2,361,661

UNITED STATES PATENT OFFICE 2,361,661

STEREOSCOPIC CAMERA

Elliott W. Sparling, Los Angeles, Calif., assignor, by mesne assignments, to Milton Schwarzwald, Los Angeles, Calif.

Application July 23, 1941, Serial No. 403,688

15 Claims. (Cl. 95—18)

This invention relates to and has for an object the provision of a stereoscopic camera embodying certain structural characteristics which include compactness, light weight, a case preferably formed of plastic material and which is capable of ornamentation, and, more particularly, includes a simple, efficient and economical shutter mechanism arranged for easy operation and adjustable for providing a plurality of exposure intervals of variable extent so as to be useful under various conditions.

Another object is to provide a camera which is readily disassembled and assembled for the purpose of changing the parts thereof, for inserting and removing film and which does not require expert attention especially when it is used in color photography for which it is particularly adapted.

A further object is to provide in a stereoscopic camera a shutter mechanism including a manually adjustable aperture member which is provided with a plurality of apertures of different area for each of the lenses and a pair of cooperating shutter members which are manually actuated for regulating the duration of the exposures regardless of which of the apertures in the first mentioned member is positioned for use.

A still further object is to provide a manually operable member for making time exposures. Other objects may appear as the description of my camera progresses.

I have shown in the accompanying drawings a preferred form of device embodying my improvements, subject, however, to modification within the scope of the appended claims without departing from the spirit of my invention.

Figure 1:
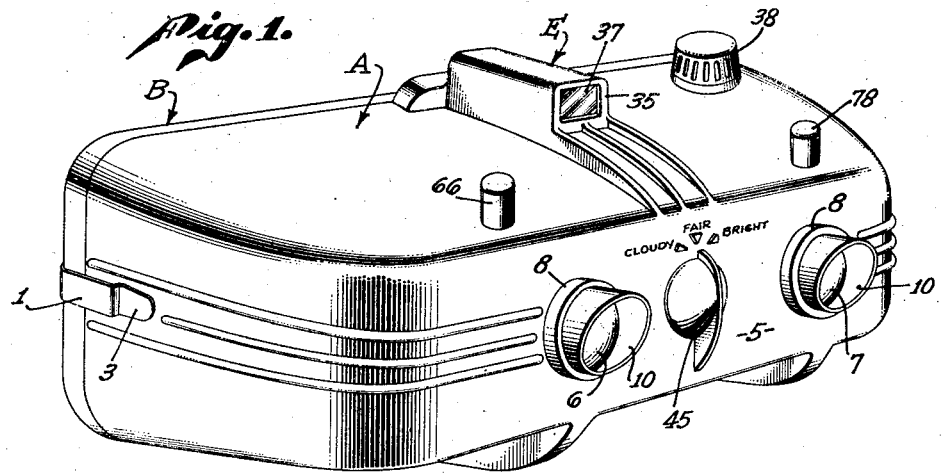
Fig. 1 is a perspective view of a camera embodying my improvements.
Figure 2:
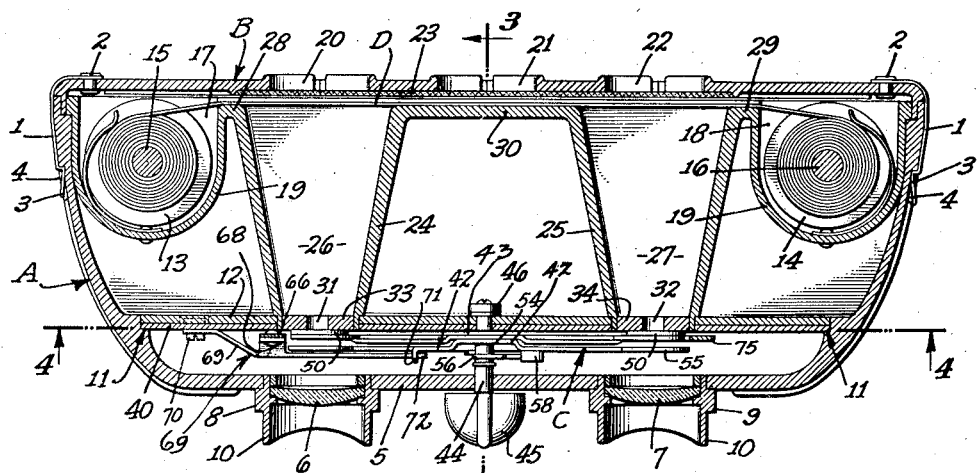
Fig. 2 is a sectional plan of the same taken in a medial plane.
Figure 3:
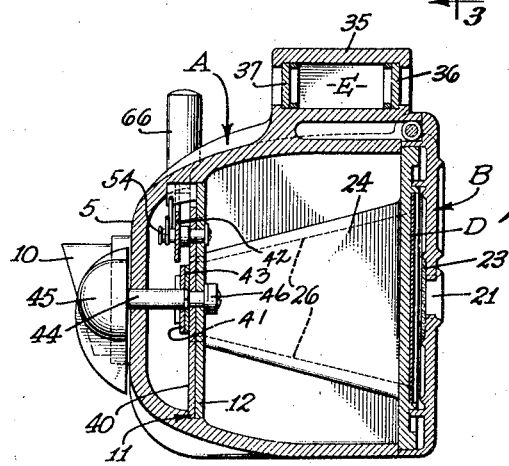
Fig. 3 is a sectional elevation on line 3—3 of Fig. 2.

Referring particularly to Figs. 1, 2 and 3, it will be noted that the case A is molded into a desired form from plastic or die cast materials and includes a cover plate B at the back secured in position on case A as by means of spring fasteners 1 which may be attached at 2 to the back B and have shouldered attaching portions 3 which yieldably seat in depressions 4 formed in the ends of case A. Thus the back B is removably held in position on the case A.

The front wall 5 of case A supports a pair of ocularly spaced lenses 6 and 7 held in usual mountings 8 and 9, respectively, and which are preferably provided with outwardly projecting hoods or shields 10 to protect the lenses from high lights when pictures are being made. Inwardly of the front wall 5 I provide a shoulder 11, against which is seated and to which is suitably secured a plate 12 which carries a shutter mechanism generally represented at C rearwardly of the lenses 6 and 7.

Film spools 13 and 14 are removably mounted on spindles 15 and 16, respectively adjacent the back B so that a film D may be supported on said spools in such a manner that it may be unwound from one spool and wound on the other spool as the successive areas on the film are exposed in the operation of the camera.

The spools 13 and 14 are preferably enclosed in light proof compartments 17 and 18, respectively, which have arcuate walls 19 open adjacent the back B, said back serving to close the rear sides of said compartments. Back B is provided with a trio of apertures 20, 21 and 22 which are commonly covered by a glass 23 of amber or red color as may be desired, so as to render the numerals on the film carrier readily visible through said glass but will prevent sufficient light entering through said apertures to affect the unexposed film. Apertures 20 and 22 are axially alined with lenses 6 and 7, respectively, while aperture 21 is equally spaced from apertures 20 and 22.

The interior of the case A is partitioned as at 24 and 25 so as to provide compartments 26 and 27, respectively, extending from plate 12 rearwardly to film D, so as to confine the light within the compartments 26 and 27 which is admitted through lenses 6 and 7. The intervening spaces between compartments 17 and 26, 18 and 27, and 26 and 27, have longitudinal portions 28, 29 and 30, respectively, alined with and over which film D is movable. The compartments 26 and 27 may be circular, or rectangular in cross section, depending upon the size and character of the exposable areas on film D. Light is admitted to compartments 26 and 27 through apertures 31 and 32 formed in closures 33 and 34, respectively, held in the forward ends of compartments 26 and 27, as shown in Fig. 2.

Centrally mounted on the upper side of the case A I provide a finder E having usual characteristics including a housing 35 and glasses 36 and 37 mounted in opposite ends of the housing, the rear glass being clear or ground. The spindle 16 of the rewind spool 14 is extended upwardly through the top of case A and is provided with a knob 38 by means of which the film D may be advanced, stage by stage for exposing successive areas of the film when said areas are moved into positions of registration with the compartments 26 and 27 and the associated lenses 6 and 7.

Plate 12 of the shutter mounting may be secured in position to the case A as by means of screws 39 and preferably has a thinner plate 40 suitably secured to the forward sides thereof on which the shutter elements are directly mounted, as shown in Figs. 2 and 3. The shutter proper includes an apertured member 41 and a closure element 42, but, in addition thereto I provide a third member 43 which is independently adjustable relative to said members 41 and 42 for the purpose of varying the quantity of light admitted to the camera through the lenses 6 and 7. Members 41 and 43 are coaxially mounted on a shaft 44 which is rotatably held on the front wall 5 of the case and plates 12 and 40, the outer end of said shaft carrying a manually operable knob 45 and the inner end carrying a head 46 adjacent the inner side of plate 12, as shown in Fig. 2.

For the reason that in a stereoscopic camera separate pictures are taken at ocularly spaced points the shutter elements 41, 42 and 43 have corresponding portions extended in oppositely from their axes so as to simultaneously and correspondingly regulate the admission of light to the film through the pair of lenses 6 and 7. Thus member 41 has corresponding arcuate portions 47 and 47' except that the portion 47' is provided with a shoulder 48 for the purpose hereinafter described. The portions 47 and 47' of member 41 have corresponding elongated arcuate apertures 49 formed therein which register at intervals with apertures 31 and 32 in plate 12.

Member 43 has corresponding portions 50 with a plurality of diametrically spaced apertures of gradually differing size, as at 51, 52 and 53, which are adjustable relative to and for regulating the effective area of the apertures 31 and 32 of plate 12. Member 43 is fixed to pin 44 so that when knob 45 on the front of the case is adjusted, selectively, to one of the three positions indicated as "Cloudy," "Fair" or "Bright," the member 43 will be so moved as to register the apertures 53, 52 or 51 with the apertures 31 and 32, in the order named.

Figure 4:
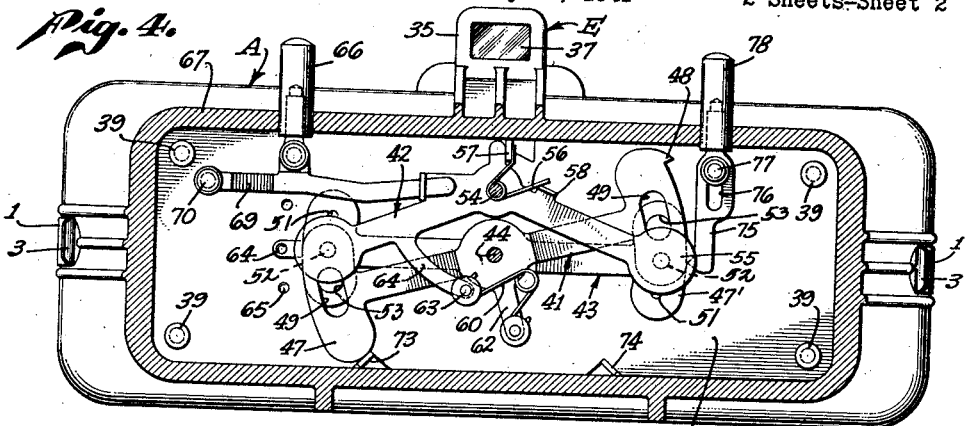
Fig. 4 is a sectional elevation on line 4—4 of Fig. 2; in which the shutter mechanism is shown in a position of rest preparatory to making an exposure of the film through a medium sized aperture.
Figures 5, 6, 7:
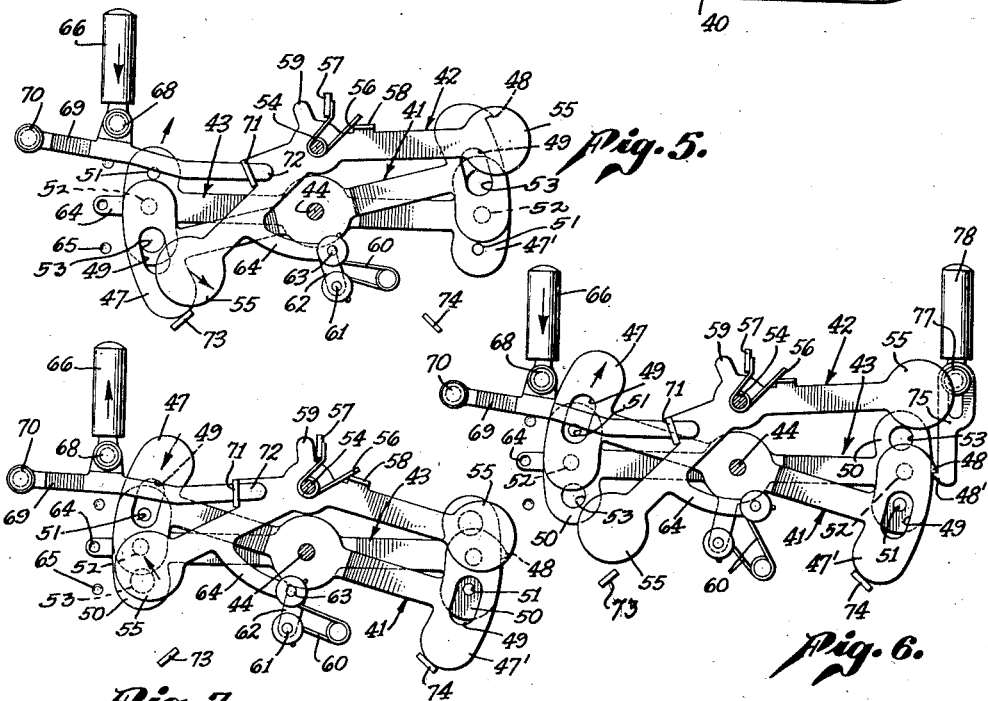
Fig. 5 is a face view of the shutter mechanism following its actuation to a preliminary extent and just previous to opening the aperture for making an exposure.
Fig. 6 is a similar view of the shutter mechanism just following an exposure.
Fig. 7 is a view of the same as the shutter elements near the completion of an exposure making operation.
Figure 8:
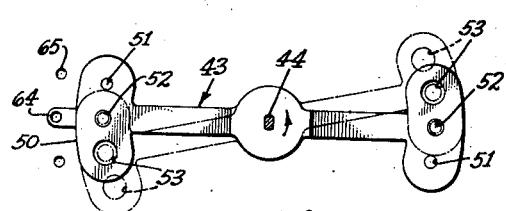
Fig. 8 is a face view of the aperture elements of the shutter mechanism shown in a medial position in full lines and in an extreme position in dotted lines.

Member 42 is pivotally mounted on plate 12 on a stud 54 which is axially spaced from pin 44 and, as shown, is above said pin, and has similar arcuately formed portions 55 uniformly spaced from the axis of stud 54 but not diametrically arranged as in the case of the members 41 and 43. Said portions 55, as shown in Fig. 4, are adapted to normally rest over the apertures 31 and 32 while the apertures 49 in member 41 are out of registration with apertures 31 and 32.

Member 42 is tensioned by means of a main spring 56 which has one of its extremities engaged with a fixed lug 57 formed outwardly of plate 40 and its other extremity engaged with a lug 58 formed on the right hand side of member 42, as shown in Figs. 4 to 7 inclusive. The tension of spring 56 thus tends to move member 42 in a clockwise direction to an extent which is limited by a lug 59 on the central portion of member 42 which engages the lug 57, so that normally the portions 55 of said member will rest over the apertures 31 and 32 in plate 12.

Members 41 and 42 are resiliently connected by means of a spring 60 which has one extremity attached at 61 to an arm 62 of member 41 and its other extremity attached at 63 to an arm 64 of member 42, said spring being intermediately looped to provide sufficient tension when member 42 is operated in a counterclockwise direction to effect the operation of member 41 in a clockwise direction by reason of the movement of the spring terminal 63 over dead center position relative to its terminal 61.

Member 43 has on one of its terminal portions 50 a lug 64 adapted to frictionally engage one of a series of depressions 65 formed in plate 40 for holding said member in its preadjusted position. Thus, when member 42 is operated the shutter is rapidly opened and closed against the tension of spring 56, said spring serving to restore the shutter elements to their normal positions of rest over the apertures 31 and 32 in plate 12.

I provide an actuator 66 slidably mounted in the top 67 of the case A which is pivotally connected at 68 with a lever 69 mounted at 70 on plate 12 and having a portion 71 extended through a lug 72 on member 42, whereby when the actuator 66 is depressed the member 42 will swing in a counterclockwise direction and effect the reverse movement of member 41 when the spring terminal 63 moves over dead center position relative to terminal 61. Thus, the portions 55 of member 42 are moved out of registration with apertures 31 and 32 prior to the movement of member 41 in a clockwise direction, thereby momentarily exposing the film D through apertures 31 and 32 and the elongated apertures 49, 49 in member 41, following which action the corresponding extremities of portions 47 and 47' again cover the apertures 31 and 32 and exclude light from the film. Upon release of the actuator 66 the tension of spring 56 moves member 42 into aperture closing position prior to the ensuing movement of member 41. The movement of member 41 is limited by means of fixed stop lugs 73 and 74 which are engaged by the portions 47 and 47' of said member for, respectively, limiting the operating and retracting strokes of member 41.

For making time exposure photographs it is desirable to arrange the shutter so that regardless of the adjustment of the selector 43 the members 41 and 42 may be stopped when the portions 55 have been moved beyond the apertures 31 and 32 and whatever apertures of member 43 may have been previously selected and while the apertures 49 of member 41 are in registration with the apertures 31 and 32. Hence I provide on the portion 47' of member 41 the shoulder 48 which is adapted to be engaged by a similar shoulder 48' on a slide 75 which has an elongated slot 76 movable over a pin 77 and an operating member 78 slidably held in the top of case A. Said operating member may be frictionally or otherwise held in adjusted position and its movement, as shown in Fig. 4, is such that it will stop the movement of members 41 and 42 when it is depressed to a predetermined extent and the duration of an exposure is determined by the length of time the actuator 66 is held downwardly after the time exposure member 78 has been set.

In operation, if a "snap shot" is to be taken, the aperture selector 43 is set by means of the knob 45 to a position which will indicate the prevailing conditions, so that if the weather is cloudy, fair or bright, the apertures 53, 52 or 51, respectively, will be positioned in registration with the apertures 31 and 32 of plate 12. Unexposed areas of film D are moved into positions behind the lenses 6 and 7, the actuator 66 is depressed and released, and the shutter members 41 and 42 will be moved rapidly in first one and then the opposite direction for momentarily opening the apertures 31 and 32 and exposing the film for a necessary length of time, after which the members 41 and 42 are automatically restored to non-exposing positions by the tension of spring 56.

When a time exposure is to be made, the operating member 78 is depressed for limiting the movement of the shutter member to a position of registration of the apertures 49 therein with the plate apertures 31 and 32, and thereafter the actuator 66 is depressed for effecting the operation of the shutter, in the same manner as before, after a suitable interval. At the completion of either operation the shutter members are restored to normally closed positions relative to the apertures 31 and 32, as shown in Fig. 4.

What I claim is:

1. A stereoscopic camera comprising: a case and ocularly spaced lenses mounted in a wall of said case, and a shutter mechanism disposed rearwardly of said lenses and including a first and a second coaxial and relatively movable member having portions adapted to open and close apertures in said case adjacent said lenses, said members having apertures movable into and from a position of registration with apertures in said case, the second member having apertureless portions also movable relative to and adapted to cooperate with the first member for regulating the exposure of a sensitized element carried by the camera, and a third element movable relative to and adapted to regulate admission of light through the apertures in the first and second member.

2. A stereoscopic camera comprising: a case and ocularly spaced lenses mounted in a wall of said case, and a shutter mechanism disposed rearwardly of said lenses and including a pair of coaxial and relatively movable members having portions adapted to open and close apertures in said case adjacent said lenses, one of said pair of members having a series of apertures selectively movable into and from a position of registration with the aperture in said case, and the second of said pair of members having a single aperture and apertureless portions also movable relative to and adapted to selectively regulate the opening of a given aperture in the first mentioned member for registration with the aperture in said case, means for automatically restoring the second of said pair of members to normal position at the completion of each operation, and a third member operable to regulate the passage of light through the aperture in the first and second members.

3. A stereoscopic camera comprising: a case and ocularly spaced lenses mounted in a wall of said case, and a shutter mechanism disposed rearwardly of said lenses and including first and second members coaxially pivoted and having ocularly spaced portions adapted to open and close ocularly spaced apertures in said case adjacent said lenses, one of said members having apertures movable into and from a position of registration with and adapted to be selectively fixed relative to the apertures in said case, and a second of said members having ocularly spaced apertureless portions also movable relative to the apertures in said case and also with respect to the apertures in said first member, and means externally of said case for manually operating said shutter members.

4. A stereoscopic camera comprising: a case and ocularly spaced lenses mounted in a wall of said case, and a shutter mechanism disposed rearwardly of said lenses and including a first and a second pair of coaxially pivoted and relatively movable member having ocularly spaced portions adapted to open and close correspondingly spaced apertures in said case adjacent said lenses, said first member having an aperture on each side of its pivot movable into and from position of registration with a corresponding aperture in said case, and the second member having correspondingly spaced apertureless portions also movable relative to and adapted to normally close apertures in said case, and manually operable means externally of said case operative for arresting the movement of at least one of said shutter members for maintaining the aperture in said case exposed to light for a predetermined interval of time.

5. A stereoscopic camera comprising: a case and ocularly spaced lenses mounted in a wall of said case, and a shutter mechanism disposed rearwardly of said lenses and including a first and a second coaxial and relatively pivoted member having portions on opposite sides of its pivot adapted to cooperate to open and close ocularly spaced apertures in said case adjacent said lenses, said first member having correspondingly spaced apertures of different size movable into and from positions of registration with the apertures in said case, said second member having apertured and apertureless portions, also movable relative to and adapted to normally close the apertures in said case and in said first member, and means externally of said case operable for arresting the movement of said apertured shutter member for admitting light through the aperture of said case and said shutter members for a predetermined interval of time.

6. A stereoscopic camera comprising: a case and ocularly spaced lenses mounted in a wall of said case, and a shutter mechanism disposed rearwardly of said lenses and including a first and second centrally pivoted and relatively movable members having ocularly spaced portions on opposite sides of their pivots adapted to open and close aperture in said case adjacent said lenses, said first member having a series of ocularly spaced apertures movable into and from positions of registration with apertures in said case, said second member having correspondingly spaced apertured and apertureless portions also movable relative to and adapted to normally close the apertures in said case and in said first member, and means for limiting the movement of said shutter members.

7. A stereoscopic camera comprising: a case and ocularly spaced lenses mounted in a wall of said case, and a shutter mechanism disposed rearwardly of said lenses and including a first and a second coaxially pivoted and relatively movable member having ocularly spaced portions adapted to open and close apertures in said case adjacent said lenses, both of said members having apertures movable into and from positions of registration with apertures in said case, and the second member having apertureless portions also movable relative to and adapted to normally close the apertures in said case and in the first member, a third member without apertures, and means for resiliently connecting the second and third members whereby one of said members will be operated to a predetermined extent prior to the operation of the other shutter member.

8. A stereoscopic camera comprising: a case and a pair of ocularly spaced lenses mounted in a wall of said case, and a shutter mechanism disposed rearwardly of said lenses and including a plurality of relatively oscillatable members having ocularly spaced portions adapted to open and close apertures in said case adjacent said lenses, the first and second of said members having apertures movable into and from positions of registration with apertures in said case, and with each other, and the third of said members having apertureless portions also movable relative to and adapted to normally close the apertures in said case and the first and second members, and means for resiliently connecting the second and third of said shutter members whereby said third member may be operated to a predetermined extent prior to the operation of the apertured members.

9. A stereoscopic camera comprising: A case and a pair of ocularly spaced lenses mounted in a wall of said case, and a shutter mechanism disposed rearwardly of said lenses and including a first and second member coaxially pivoted and relatively movable members having ocularly spaced portions adapted to open and close apertures in said case adjacent said lenses, said first member having apertures on each side of its pivot which are selectively movable into and from positions of registration with the corresponding apertures in said case, and the second of said members having an apertured and an apertureless portion on each side of its pivot also movable relative to and adapted to alternately open and close the apertures in said case and the apertures in said first member, and a third member centrally pivoted axially offset from the first and second members and having aperture closing portions on each side of its pivot, means for resiliently connecting said second and third shutter members whereby one of said members will be operated to a predetermined extent prior to the operation of the first shutter member, and manually operable means associated with said shutter members for selectively operating the third shutter member so as to rapidly open and close the apertures in said case and to open said case apertures for a predetermined period of time.

10. A stereoscopic camera comprising: a case having a pair of ocularly spaced lenses mounted in a wall thereof, means for supporting a light sensitive element rearwardly of said lenses, and a shutter mechanism interposed between said lenses and said element and including a centrally pivoted first aperture member having corresponding portions provided with ocularly spaced apertures for registration with said lenses and apertures in said case, and a second member coaxially pivoted with the first member and having apertures and aperture closing portions on opposite sides of its pivot movable relative to the apertures in the case and in the first member, a third member centrally pivoted but offset from the first and second members and having aperture closing portions, means for manually actuating said second and third members so as to rapidly open and close said case apertures for admitting light to said film, and manually operable means for arresting and limiting the movement of said second member, for providing time exposures of said film.

11. A stereoscopic camera comprising: a case having a pair of ocularly spaced lenses mounted in a wall thereof, means for supporting a light sensitive element rearwardly of said lenses, and a shutter mechanism interposed between said lenses and said element and including a centrally pivoted first aperture member having corresponding ocularly spaced portions each provided with a series of apertures of different area for registration with said lenses and apertures in said case, a second member coaxial with the first member centrally pivoted and having apertures and aperture closing portions movable relative to said case apertures and the selected apertures in the first member, a third shutter member for closing the apertures in the first and second members, means for manually actuating said second and third members so as to rapidly open and close said case apertures for admitting light to said film, means for adjusting the first member to position selected apertures in the first member in registration with the case apertures, and means for effecting the restoration of said shutter members except of said first member to normally closed position upon the release of said actuating means.

12. A stereoscopic camera comprising: a case having a pair of ocularly spaced lenses mounted in a wall thereof, means for supporting a light sensitive element rearwardly of said lenses, and a shutter mechanism interposed between said lenses and said element and including a first member centrally pivoted and having corresponding ocularly spaced portions each provided with a plurality of apertures of different area for selective registration with said lenses and apertures in said case, a second member coaxial with the first member and having a single aperture and aperture closing portions movable relative to said case apertures and lenses, and also relative to the apertures in the first member, and a third member having correspondingly spaced apertureless portions for registration at times with the first and second members, means for manually actuating said second and third members so as to rapidly open and close said case apertures for admitting light to said film, means for effecting the automatic restoration of said second and third shutter members to normally closed position upon the release of said actuating means, and a manually operable member for arresting the movement of said second shutter member at a selected point, for admitting light to and for exposing said film for a predetermined length of time.

13. A stereocopic camera comprising: a case having a pair of ocularly spaced lenses mounted in a wall thereof, means for supporting a light sensitive element rearwardly of said lenses, and a shutter mechanism interposed between said lenses and said element and including an ocularly apertured member having corresponding portions provided with apertures for registration with said lenses and apertures in said case, a second member having ocularly spaced aperture closing portions movable about a central pivot relative to said case apertures and lenses, means for manually actuating said members so as to rapidly open and close said case apertures for admitting light to said film, means for effecting the automatic restoration of said shutter members to normally closed position upon the release of said actuating means, and a manually operable member for arresting the movement of one of said shutter members at a selected point, for admitting light to and for exposing said film for a predetermined length of time, said actuating means being operative for effecting the exposure of the film when said manually operable member is operated and said shutter being automatically restored to normally closed position when said actuating means is released.

14. A stereoscopic camera comprising: a case having ocularly spaced lenses and apertures, and a shutter mechanism rearwardly of the lenses and including a centrally pivoted aperture member having ocularly spaced portions, each provided with a plurality of apertures of different area, means for adjusting said member to register selected apertures therein with the apertures in the case, a centrally pivoted aperture closing member having apertureless portions movable relative to and for regulating the opening and closing of the apertures in the case and in the aperture member, and means for operating said members.

15. A stereoscopic camera as characterized in claim 14, including: a third member coaxial with said aperture member and having ocularly spaced apertures of substantially greater extent than the apertures in the aperture member together with aperture closing portions, said third member being operable relative to the other members for varying the exposures effected through the case apertures.

ELLIOTT W. SPARLING.